United States Patent [19]

Kato

[11] E Re. 30,822

[45] Reissued Dec. 15, 1981

[54] DISPLAY DEVICE

[76] Inventor: Taketoshi Kato, No. 28-6, 3-Chome Botan, Koto-Ku, Tokyo, Japan

[21] Appl. No.: 133,776

[22] Filed: Mar. 25, 1980

Related U.S. Patent Documents

Reissue of:

[64] Patent No.: 4,080,747
Issued: Mar. 28, 1978
Appl. No.: 688,632
Filed: May 21, 1976

[30] Foreign Application Priority Data

May 21, 1975 [JP] Japan ..... 50-67904[U]

[51] Int. Cl.[3] ..... G09F 7/22
[52] U.S. Cl. ..... 40/613
[58] Field of Search ..... 40/613, 439, 615

[56] References Cited

U.S. PATENT DOCUMENTS

| | | | |
|---|---|---|---|
| 770,931 | 9/1904 | Seary | 40/613 |
| 2,938,291 | 5/1960 | Tavan | 40/613 |
| 3,166,863 | 1/1965 | Gray | 40/613 |
| 3,202,291 | 8/1965 | Thrasher | 40/613 |
| 3,206,882 | 9/1965 | Thatcher | 40/613 |
| 3,260,372 | 7/1966 | Jauslin | 40/613 |
| 4,017,992 | 4/1977 | Kajitani | 40/613 |

FOREIGN PATENT DOCUMENTS

| | | | |
|---|---|---|---|
| 2308650 | 2/1973 | Fed. Rep. of Germany | 40/613 |

*Primary Examiner*—Gene Mancene
*Assistant Examiner*—Wenceslao J. Contreras
*Attorney, Agent, or Firm*—Ladas & Parry

[57] ABSTRACT

A display device *comprises a base panel* having a plurality of [base] *unit* panels. Each [base] *unit* panel has an arm projecting perpendicular to the plane of the base panel. The arm has a [flat portion parallel to the plane of the base panel at an upper end of the arm, and slat area at a lower end of the arm. A pin is disposed at the end of the arm to suspend freely a reflecting plate, which moves about by breeze to provide an attractive shimmering effect.] *terminal top end surface, a width of which is greater than the height thereof in front view. A rod, having a head, extends from the terminal top end surface of the projecting arm, to which a reflector plate is loosely and swingably fitted.*

13 Claims, 9 Drawing Figures

DISPLAY DEVICE

Matter enclosed in heavy brackets [ ] appears in the original patent but forms no part of this reissue specification; matter printed in italics indicates the additions made by reissue.

BACKGROUND OF THE INVENTION

The present invention relates to a display device of the type used on advertising or other signs comprising a plurality of projecting arms, and small light reflecting plates which are freely suspended on the arms. These plates are mounted so that they have independent and limited free swinging movement on their projecting arms, and when the plates are moved about by a breeze, the sign gives the illusion of having mechanically moved and illuminated parts and provides an attractive shimmering effect and a pleasant metallic whisper.

Display devices of the type are already known in, for example, U.S. Pat. Nos. 2,938,291; 3,043,039; 3,260,372.

In the conventional prior art as disclosed in the above U.S. Patents, however, problems have encountered in that every reflecting plate of the display device does not actually have a limited free swinging movement responsive to a breeze. More specifically, in the conventional display device, the degrees of a back-and-forth movement with respect to a plane of a panel are substantially constant every time when the reflecting plates swing about the arm, which suspend the plates, about several tens of angular degrees, and when the plate is further swung by 180° by a stronger wind from the original or a windless condition. Further, the above-stated back-and-forth movement of the reflecting plates has been relatively large, and therefore, some of the plates face this way while the other that way even in a windless condition.

Furthermore, when the reflecting plates are swung by a breeze, only a small friction drag is found at the arm which freely suspends the reflecting plates. The friction drag is so small that it takes a relatively great amount of time until the reflecting plates which have been swung restore to the normal original position. In other words, the swung plates come back to the original position, swinging like a pendulumn of a clock, resulting in taking a great amount of time to return to the original position. Therefore, the reflecting plates have not been of rapid response to a continuous breeze.

Further, when the reflecting plates are wound by 180° so that the plates stand in an upside-down manner, it has been found that the reflecting plates sometimes stand still in the upside-down manner due to the fact that a component of force which pushes the reflecting plates toward a backing sheet or base member from which the arms projects for suspending the plates is so small.

Accordingly, an object of the present invention is to provide an improved display device wherein reflecting plates are rapidly responsive to a breeze.

Another object of the present invention is to provide an improved display device wherein reflecting plates return to the original position when they are swung by a breeze, in an immediate manner.

Further objects of the present invention is to provide an improved display device wherein the aforementioned shortcomings of the conventional device are removed.

DETAILED DESCRIPTION OF THE INVENTION

Figure 1:
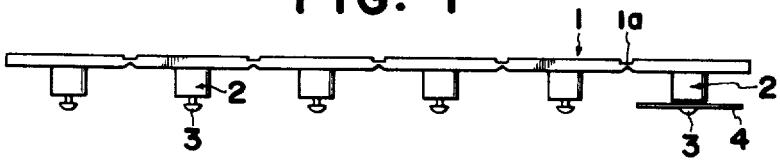
FIG. 1 is a plan view of a display device embodying the present invention.
Figure 2:
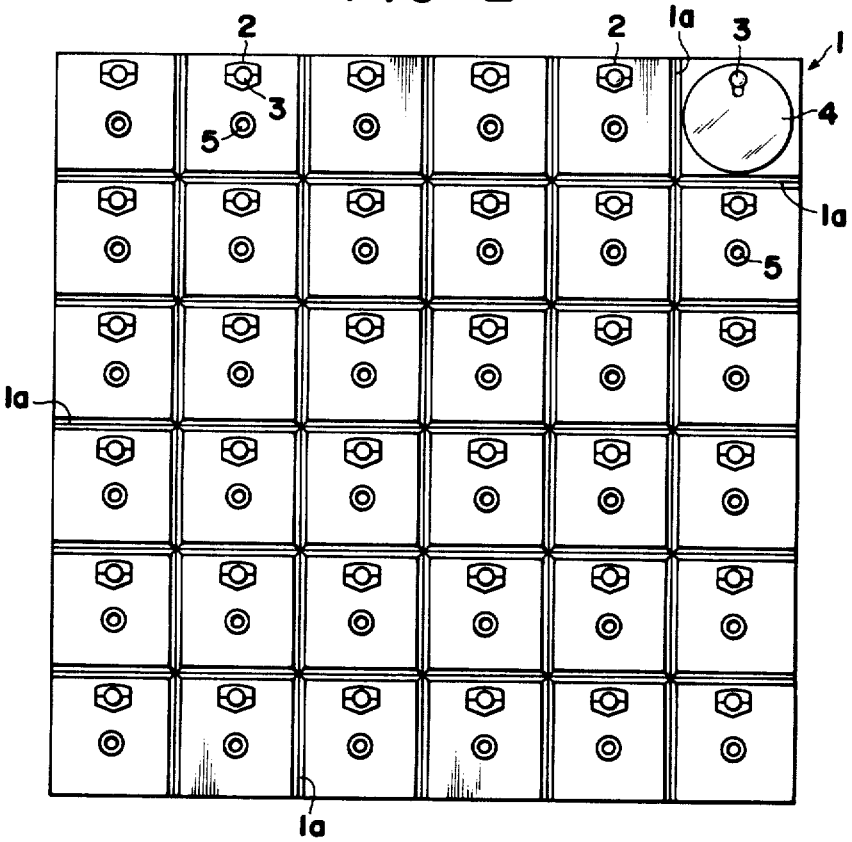
FIG. 2 is a front elevation of the display device shown in FIG. 1.
Figure 3:
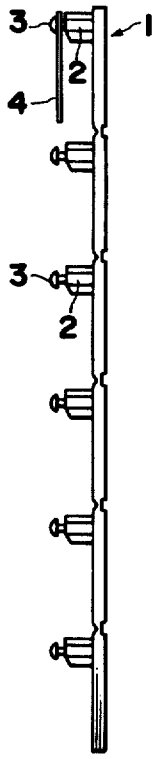
FIG. 3 is a side elevation of the display device shown in FIG. 1.

Referring to FIGS. 1, 2 and 3, a plurality of rectangular unit panels 1 made of synthetic resins are juxtaposed in a row and line relation with a groove 1a therebetween, each unit panel having an arm 2 which is formed integral with the unit panel and projects from an upper-middle portion of the panel 1 perpendicularly to the plane of the unit panel. A pin, or rivet, 3 which has a semi-spherical head is disposed on the end of the arm 2 so that a reflecting plate 4, which will be described below, is freely suspended but not easily removed. The arms 3 are equidistantly spaced from one another and are disposed at right angles to the face of the unit panel.

Figure 4:
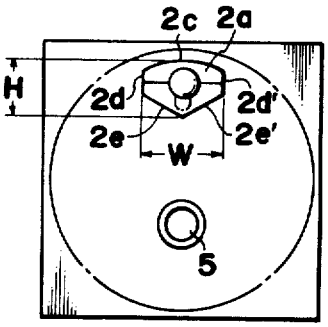
FIG. 4 is a front view of the unit panel of the display device in an embodiment of the present invention.
Figure 5:
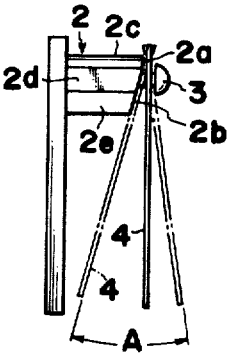
FIG. 5 is a side view of the unit panel shown in FIG. 4.
Figure 6:
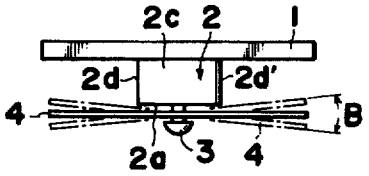
FIG. 6 is a plane view of a unit panel shown in FIG. 4.

In FIGS. 4, 5 and 6, the arm 2 which projects from the upper surface of the unit panel 1 has, at the upper portion, an upper surface 2a which is substantially parallel to the plane of the unit panel 1 and, at the lower portion, a slant area 2b which inclines toward the unit panel as it goes downward as well illustrated in FIG. 5. The slant area 2b has an inclination of 19–28 degrees with respect to the projecting direction of the arm 2. As shown in FIG. 4, the arm 2 has, in cross section, a pentagonal configuration but has a curved surface 2c at the upper portion thereof. Two sides 2d and 2d', which face opposite to each other, are relatively short and parallel to each other. From the bottom end of the sides 2d, 2d' are extended two faces 2e, 2e' which intersect to each other below the center of the arm 2 so that the arm has a tapered surfaces (2d, 2d') at the lower portion thereof. Further, the arm 2 is so formed that the height (shown at H) is smaller than the width (shown at W).

A care should be taken that the pin 3 is disposed such that when the reflecting plate 4 is swung about the pin 3 so that when the upper portion of the head of the pin 3 contacts the upper surface of the reflecting plate 4, the reflecting plate 4 may be in slight contact with the slant area 2b of the arm 2 and the bottom portion of the plate 4 is spaced from the unit panel 1, as illustrated in FIG. 5 (shown by phantom line 4').

Figure 7:
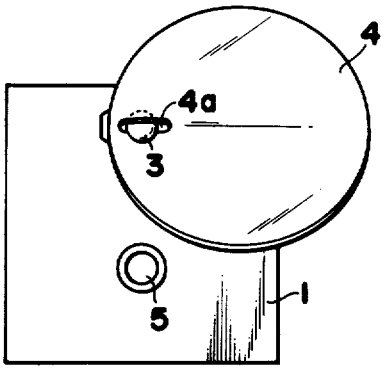
FIG. 7 is a front view of a unit panel, showing how to fit the reflecting plate to the unit panel.
Figure 8:
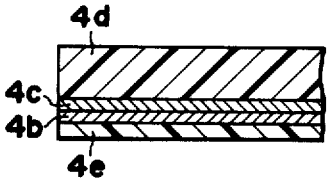
FIG. 8 is a sectioned view of the reflecting plate used in the present display device.

In FIGS. 7 and 8, the reflecting plate 4 is of circular shape and has an eccentric elongated hole 4a, through which the pin 3 is inserted to freely suspend the reflecting plate 4. The elongated hole 4a has a length larger than the diameter of the head of the pin 3, and a width smaller than the diameter of same but slightly larger than diameter of the stem portion of the pin 3. The reflecting plate 4 has a hole 5 through which a fixing member such as a nail or screw is inserted to fix the plate to a desired place.

As shown in FIG. 8, the reflecting plate 4 has a reflecting layer 4b produced by vacuum deposition of a vapor of aluminum on a polyester film, a semitransparent pigment-colored layer 4c formed on top of the layer 4c, a transparent plastic layer 4d on top of the colored layer 4c, and a protective layer 4e of plastics provided beneath the aluminum-deposited reflecting layer 4b. The reflecting layer 4b may be aluminum foil.

Figure 9:
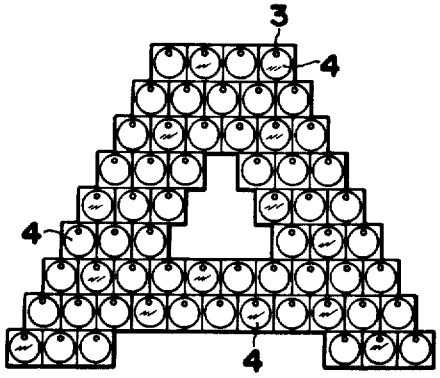
FIG. 9 is a front elevation of the unit panels of the present display device, showing an alphabetical "A" formed with the unit panels.

As shown in FIG. 9, a plurality of the unit panel 1 each of which suspends a reflecting plate 4 are arranged to provide a desired letter or the like, such as an alphabetical "A" in FIG. 9.

As described above, the upper surface 2a which is formed parallel to the plane of the unit panel 1 allows a rapid returning of the reflecting plate 4 to the original position immediately after the reflecting plate 4 is swung by 180° since a component of force toward the unit panel is quite small. Further, the combination of the upper surface 2a and the slant area 2b provides differences in inclination and back-and-forth movement between the reflecting plate which is in normal position and another reflecting plate which is located below the plate in an upside-down manner, thereby preventing the two reflecting plates from being intertwined or contacted with each other even when a drop of water is attached on the reflecting plates due to rainy weather.

Further, the slant area 2b and the pin 3, the latter being *preferably* disposed in such a manner that the reflecting plate 4 may not contact with the unit panel 1 even in a maximum movement of the reflecting plate 4, allow a desired free movement of the reflecting plate 4 by a breeze without a close contact between the reflecting plate 4 and the unit panel 1.

Moreover, the slant area 2b allows an easy and simple assembly of the reflecting plates, by merely pushing the reflecting plate 4 onto the head of the pin 3 so that the head of the pin passes through the eccentric elongated hole 4a of the reflecting plate 4, as shown in FIG. 7.

In addition to the above, the arm 2 of the present display device, which is so formed that the width (W) is greater than the height (H), allows the reflecting plates which are in a normal or original position, a relatively large back-and-forth movement (illustrated by an arrow A in FIG. 5) of the reflecting plates and a relatively small swinging movement (illustrated by an arrow B in FIG. 6) of the same. Accordingly, each of the reflecting plates aligned in rows and lines is suspended still and faces substantially the same direction in a windless condition, and responds rapidly and simultaneously to a breeze from a certain direction.

Though the present invention has been described with reference to the preferred embodiment thereof, many modifications and alterations may be made within the scope of the claims attached hereto.

What is claimed is:

1. A display device comprising a base panel having a plurality of [plastic] unit panels, each of said unit panels having a [plastic] projecting arm formed integrally with said unit panel at the center of said unit panel and near the top of said unit panel, a [rivet] *rod* , having a [rivet] head, [embedded in] *extending from* the terminal top end surface of said projecting arm, and a reflector plate loosely and swingably fitted to said [rivet] *rod,* wherein said terminal top end surface of said projecting arm and said [rivet] *rod* comprise means for restricting the swinging movement of said reflector plate about said [rivet] *rod* in a direction toward and away from said [unit] panel as the back surface of said reflector plate contacts one end of said terminal top end surface of said projecting arm and the front surface of said reflector plate contacts [one end of said rivet] *said rod* during swung positions of said reflector plate, said terminal top end surface of said projecting arm [has] *having* a width greater than the height thereof in front view [and comprises a vertical upper surface section and an inclined lower surface section, said upper surface section being parallel to said unit panel while said lower surface section being inclined toward said unit panel as it extends downwardly from the upper surface section, the degree of inclination of said lower surface section and the height of said rivet being such that when said reflector plate positioned in a normal suspended position is swung backward about said rivet, the upper front surface of said reflector plate contacts the upper end of the head of said rivet, and the lower end of said reflector plate is still slightly spaced from said unit panel].

[2. A display device as claimed in claim 1, wherein said inclined lower surface section of said terminal top end surface of said projecting arm forms an angle in the approximate range of 19–28 degrees relative to the vertical plane and the height of said rivet is such that when said reflector plate is inclined with the upper end portion thereof contacting the upper end of the head of said rivet, said reflector plate is inclined along said inclined lower surface section.]

3. A display device as claimed in claim 1, wherein said base panel comprises a number of grooves formed in a lattice form longitudinally and transversely on the surface thereof, whereby said base panel can be separated along said grooves to provide a panel of desired shape.

4. A display device as claimed in claim 1, wherein said reflector plate has a longitudinal slot extending in a direction toward the center thereof from the peripheral portion thereof through which reflector plate is loosely fitted to said [rivet] *rod,* said slot having a lateral width smaller than the diameter of the head of said [rivet] *rod* and a longitudinal width larger than the diameter of the [rivet] *rod* head.

5. A display device as claimed in claim 1, wherein said reflector plate consists of a reflecting film layer of aluminum, a semitransparent pigment-colored layer formed on one surface of said reflecting film layer, a transparent plastic layer formed on the surface of said colored layer, and a protective layer of plastics coated on the other surface of said aluminum film layer.

6. A display device as claimed in claim 1, wherein said unit panel has a hole approximately at its center through which said unit panel is secured by means of a fixing member.

7. A display device as claimed in claim 1, wherein said unit panel is square and said reflector plate is circular.

8. A display device as claimed in claim 1, wherein said projecting arm has a substantially pentagonal configuration in cross section with opposite parallel upper side surfaces, tapered lower side surfaces extending from the lower ends of said upper side surfaces and an upper surface extending between the upper ends of said side surface.

*9. A display device as claimed in claim 1, wherein said terminal top end surface of said projecting arm further comprises a vertical upper surface section and an inclined lower surface section, said upper surface section being parallel to said unit panel while said lower surface section being inclined toward said unit panel as it extends downwardly from said upper surface section.*

*10. A display device as claimed in claim 9, wherein the degree of inclination of said lower surface section and the height of said rod are such that when said reflector plate positioned in a normal suspended position is swung backward about said rod, the upper front surface of said reflector plate contacts the upper end of the head of said rod, and the lower end of said reflector plate is still slightly spaced from said unit panel.*

*11. A display device as claimed in claim 10, wherein said inclined lower surface section of said terminal top end surface of said projecting arm forms an angle in the approximate range of* 19–28 degrees relative to the vertical plane and the height of said rod is such that when said reflector plate is inclined with the upper end portion thereof contacting the upper end of the head of said rod, said reflector plate is inclined along said inclined lower surface section.

*12. A display device as claimed in claim 1, wherein said rod is a rivet embedded in the terminal top end surface of said projecting arm.*

*13. A display device as claimed in claim 1, wherein said unit panel and said projecting arm are integrally formed by plastic.*

*14. A display device comprising a base panel having a plurality of unit panels, each of said unit panels having a projecting arm formed integrally with said unit panel at the center of said unit panel and near the top of said unit panel, a rod, having a head, extending from the terminal top end surface of said projecting arm, and a reflector plate loosely and swingably fitted to said rod, said terminal top end surface of said projecting arm and said rod being so dimensioned that when said reflector plate positioned in a normal suspended position is swung backward about said rod, the upper front surface of said reflector plate contacts the upper end of the head of said rod, and the lower end of said reflector plate is still slightly spaced from said unit panel.*

* * * * *